United States Patent
Liu et al.

(10) Patent No.: US 11,700,658 B2
(45) Date of Patent: Jul. 11, 2023

(54) FAST LINK SWITCH BETWEEN MULTILINK DEVICES

(71) Applicant: Apple Inc., Cupertino, CA (US)

(72) Inventors: Yong Liu, Campbell, CA (US); Jarkko L. Kneckt, Los Gatos, CA (US); Jinjing Jiang, San Jose, CA (US); Lochan Verma, Danville, CA (US); Qi Wang, Sunnyvale, CA (US); Su Khiong Yong, Palo Alto, CA (US); Tianyu Wu, Fremont, CA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 17/249,626

(22) Filed: Mar. 8, 2021

(65) Prior Publication Data

US 2021/0282210 A1 Sep. 9, 2021

Related U.S. Application Data

(60) Provisional application No. 62/986,217, filed on Mar. 6, 2020.

(51) Int. Cl.
*H04W 76/15* (2018.01)
*H04W 52/02* (2009.01)
*H04W 72/0453* (2023.01)

(52) U.S. Cl.
CPC ....... *H04W 76/15* (2018.02); *H04W 52/0235* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 10,512,002 B2* | 12/2019 | Belghoul | | H04W 76/15 |
| 11,510,269 B2* | 11/2022 | Asterjadhi | | H04W 52/0216 |
| 2016/0174163 A1* | 6/2016 | Emmanuel | | H04B 17/345 |
| | | | | 370/329 |
| 2019/0223056 A1* | 7/2019 | Bajko | | H04W 48/12 |
| 2021/0029727 A1* | 1/2021 | Lowell | | H04W 72/1263 |
| 2021/0127420 A1* | 4/2021 | Lu | | H04W 74/0808 |

FOREIGN PATENT DOCUMENTS

WO  WO-2021112558 A1 * 6/2021

* cited by examiner

*Primary Examiner* — The Hy Nguyen
(74) *Attorney, Agent, or Firm* — Fay Kaplun & Marcin, LLP

(57) ABSTRACT

A first multilink device (MLD) is configured to communicate with a second MLD using at least two communication links. The first MLD selects a first link of the at least two communication links for communications between the first MLD and the second MLD, detects that the first link is unavailable for communications, switches a radio of the first MLD to a second link of the at least two communication links, transmits an alert to the second MLD regarding the switching from the first one of the at least two communication links to the second one of the at least two communication links and communicates with the second MLD via the second link.

20 Claims, 9 Drawing Sheets

FAST LINK SWITCH BETWEEN MULTILINK DEVICES

PRIORITY CLAIM/INCORPORATION BY REFERENCE

The present disclosure claims priority to U.S. Prov. Appln. Ser. No. 62/986,217 filed Mar. 6, 2020 and entitled "FAST LINK SWITCH BETWEEN MULTILINK DEVICES," the disclosure of which is incorporated herewith by reference.

BACKGROUND

Multilink stations (STA) may connect to a wireless local area network (WLAN) via a multilink access point (AP) using, for example, links operating in the 2.4 gigahertz (GHz), 5 GHz and 6 GHz frequency bands. Current WLAN communication protocols only enable an AP/STA pair to communicate on a single channel, e.g., one link. If there is a problem with that single channel (e.g., a long network allocation vector (NAV), an overlapping basic service set (OBSS) channel access or any other type of interference on the channel), the AP/STA pair is forced to wait until the channel clears to exchange communications. These long and unpredictable channel access problems do not allow a single channel AP/STA pair to support extremely low latency (ELL) communications.

Multiple operating links may be used to support ELL communications such that when a problem is encountered on one channel, the AP/STA pair may switch to another channel to continue communicating.

SUMMARY

Some exemplary embodiments are related to a processor of a first multilink device (MLD) configured to communicate with a second MLD using at least two communication links, the processor configured to perform operations. The operations include selecting a first link of the at least two communication links for communications between the first MLD and the second MLD, detecting that the first link is unavailable for communications, switching a radio of the first MLD to a second link of the at least two communication links, transmitting an alert to the second MLD regarding the switching from the first one of the at least two communication links to the second one of the at least two communication links and communicating with the second MLD via the second link.

Other exemplary embodiments are related to a multilink device (MLD) having a transceiver configured to communicate with a second MLD using at least two communication links and a processor communicatively coupled to the transceiver and configured to perform operations. The operations include selecting a first link of the at least two communication links for communications between the first MLD and the second MLD, detecting that the first link is unavailable for communications, switching a radio of the first MLD to a second link of the at least two communication links, transmitting an alert to the second MLD regarding the switching from the first one of the at least two communication links to the second one of the at least two communication links and communicating with the second MLD via the second link.

DETAILED DESCRIPTION

Figure 1:
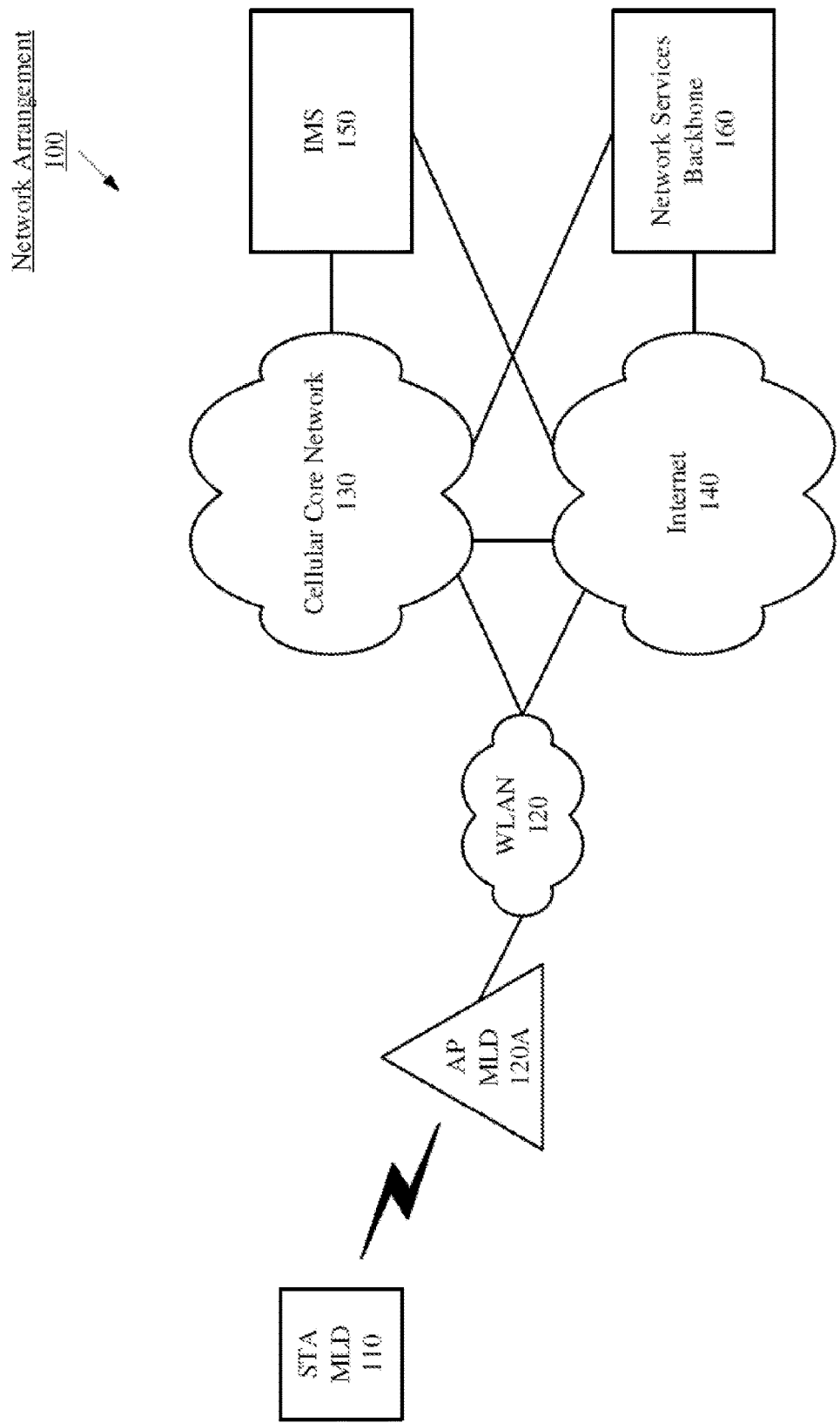
FIG. 1 shows an exemplary network arrangement according to various exemplary embodiments.

The exemplary embodiments may be further understood with reference to the following description and the related appended drawings and slides, wherein like elements are provided with the same reference numerals. The exemplary embodiments describe devices, systems and methods to switch an active link between multilink devices while supporting extremely low latency (ELL) communications.

The exemplary embodiments are described with regard to a wireless local area network (WLAN). A person of ordinary skill in the art would understand that WLAN may refer to a network that operates in accordance with any of a plurality of different types of Institute of Electrical and Electronics Engineers (IEEE) 802.11 wireless communication protocols. The exemplary embodiments are described with reference to the developing 802.11be standard. However, the exemplary embodiments may also be applied as an upgrade to other 802.11 communication protocols such as, 802.11a, 802.11b, 802.11g, 802.11n, 802.11ac, 802.11ax, etc. The WLAN may operate in several different frequency bands of the radio frequency (RF) spectrum. For example, the exemplary embodiments are described with reference to links operating in the 2.4 gigahertz (GHz), 5 GHz and 6 GHz frequency bands. However, other frequency bands may also be used, including, but not limited to, the 900 megahertz (MHz), 3.6 GHz, 4.9 GHz, 5.9 GHz, 60 GHz bands, etc. Each band may include a plurality of channels. However, any reference to WLAN, a particular communication protocol or a particular frequency band is for illustrative purposes. The exemplary embodiments apply to any type of network that supports packet-based communication over multiple links between devices.

The exemplary embodiments are described with regard to a multilink station (STA) communicating with a multilink access point (AP). However, it should be understood that the exemplary embodiments may apply to wireless communications between any two multilink devices. For example, the exemplary embodiments may be applied to communications between two multilink STAs in a peer-to-peer communication arrangement.

In some cases, an issue may arise when the AP or STA has multiple chips. In such a scenario, when the current ELL link becomes unavailable, it may be difficult or time consuming to move the packets currently buffered in the chip associated with the current ELL link to the chip associated with the new ELL link. This time delay may result in dropped packets or in not supporting ELL communications.

According to the exemplary embodiments, a radio of a first STA/AP corresponding to a link that is determined to be unavailable is tuned to a new link to allow the first STA/AP to transmit buffered ELL data packets to a receiving device. As a result, delays associated with retrieving the buffered data packets from the host STA/AP and transferring them the new STA/AP is avoided.

According to further exemplary embodiments, an STA/AP MLD is configured to duplicate ELL data packets and buffer them in a first STA/AP and one or more STA/APs. As a result, when a current link is determined to be unavailable, the STA/AP MLD may immediately switch to a different link and its associated STA/AP since that STA/AP already has the buffered ELL data packets.

FIG. 1 shows an exemplary network arrangement 100 according to various exemplary embodiments. The exemplary network arrangement 100 includes a multilink STA 110. Those skilled in the art will understand that the STA 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of STAs being used by any number of users. Thus, the example of a single STA 110 is merely provided for illustrative purposes.

Further, the exemplary network arrangement 100 includes a wireless local access network (WLAN) 120. However, the STA 110 may also communicate with other types of networks and the STA 110 may also communicate with networks over a wired connection. Therefore, the STA 110 may include a WLAN chipset to communicate with the WLAN 120 and any of a plurality of further chipsets to communicate with other types of networks (e.g., 5G new radio (NR) radio access network (RAN), Long-Term Evolution (LTE) RAN, Legacy RAN, etc.).

The WLAN 120 may include any type of wireless local area network (WiFi, Hot Spot, soft AP, IEEE 802.11 networks, etc.). As described above, the exemplary embodiments are described with reference to the developing IEEE 802.11be communication protocol. WLANs may manage access to the network via any of a plurality of different hardware devices that are configured to send and/or receive traffic from STAs that are equipped with the appropriate WLAN chipset. In the exemplary network arrangement 100, the STA 110 may connect to the WLAN 120 via a multilink access point (AP) 120A. However, reference to an AP is merely provided for illustrative purposes. The exemplary embodiments may apply to any type of multilink device that manages access to a WLAN.

In addition to the WLAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of a cellular network. The cellular core network 130 also manages the traffic that flows between the cellular network and the Internet 140. The IMS 150 may be generally described as an architecture for delivering multimedia services to the STA 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
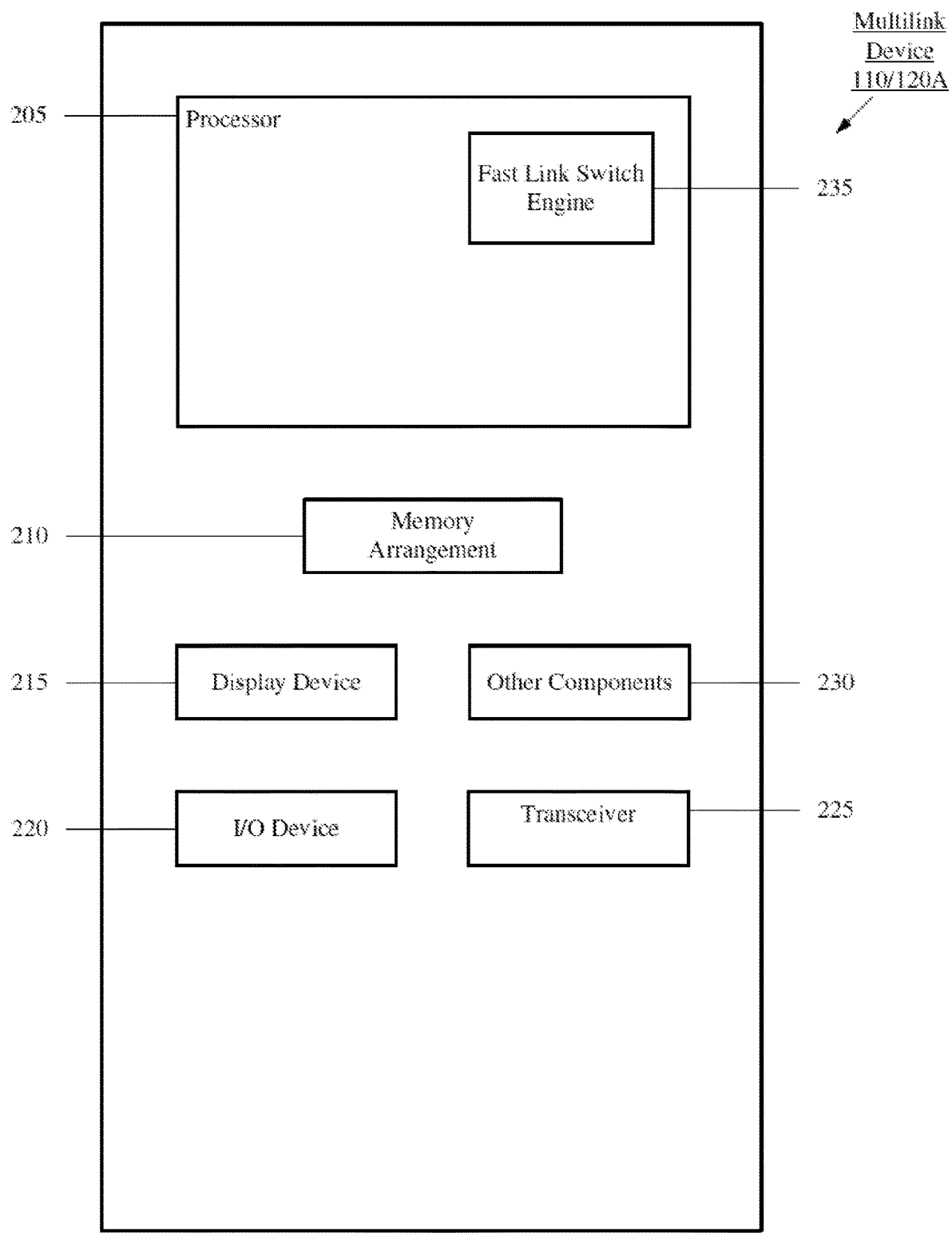
FIG. 2 shows an exemplary multilink device (MLD) according to various exemplary embodiments.

FIG. 2 shows an exemplary multilink device 110/120A according to various exemplary embodiments. That is, the multilink device described with respect to FIG. 2 may represent the STA 110 and/or the AP 120A. Those skilled in the art will understand that the STA 110 and the AP 120A may include the same components or may have some variance in the components between the devices. The multilink device 110/120A will be described with regard to the network arrangement 100 of FIG. 1. The multilink device 110/120A may represent any electronic device and may include a processor 205, a memory arrangement 210, a display device 215, an input/output (I/O) device 220, a transceiver 225, and other components 230. The other components 230 may include, for example, an audio input device, an audio output device, a battery, a constant power supply, a data acquisition device, ports to electrically connect the multilink device 110/120A to other electronic devices, sensors to detect conditions of the multilink device 110/120A, etc.

The processor 205 may be configured to execute a plurality of engines of the multilink device 110/120A. For example, the processor 205 may execute a fast link switch engine 235. The fast link switch engine 235 may determine when the multilink device 110/120A should switch between different communications links when communicating with another multilink device 110/120A. The fast link switch engine 235 being an application (e.g., a program) executed by the processor 205 is only exemplary. The functionality associated with the fast link switch engine 235 may also be represented as a separate incorporated component of the multilink device 110/120A or may be a modular component coupled to the multilink device 110/120A, e.g., an integrated circuit with or without firmware. For example, the integrated circuit may include input circuitry to receive signals and processing circuitry to process the signals and other information. The engine may be embodied as one application or separate applications. In addition, in some multilink devices 110/120A, the functionality described for the processor 205 is split among two or more processors such as a baseband processor and an applications processor. The exemplary embodiments may be implemented in any of these or other configurations of a multilink device 110/120A.

The memory 210 may be a hardware component configured to store data related to operations performed by the multilink device 110/120A. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the WLAN 120. Accordingly, the transceiver 225 may operate on a variety of different frequencies or channels (e.g., set of consecutive frequencies) as described above. As will be described in greater detail below, the transceiver 225 may include multiple radios.

Figure 3:
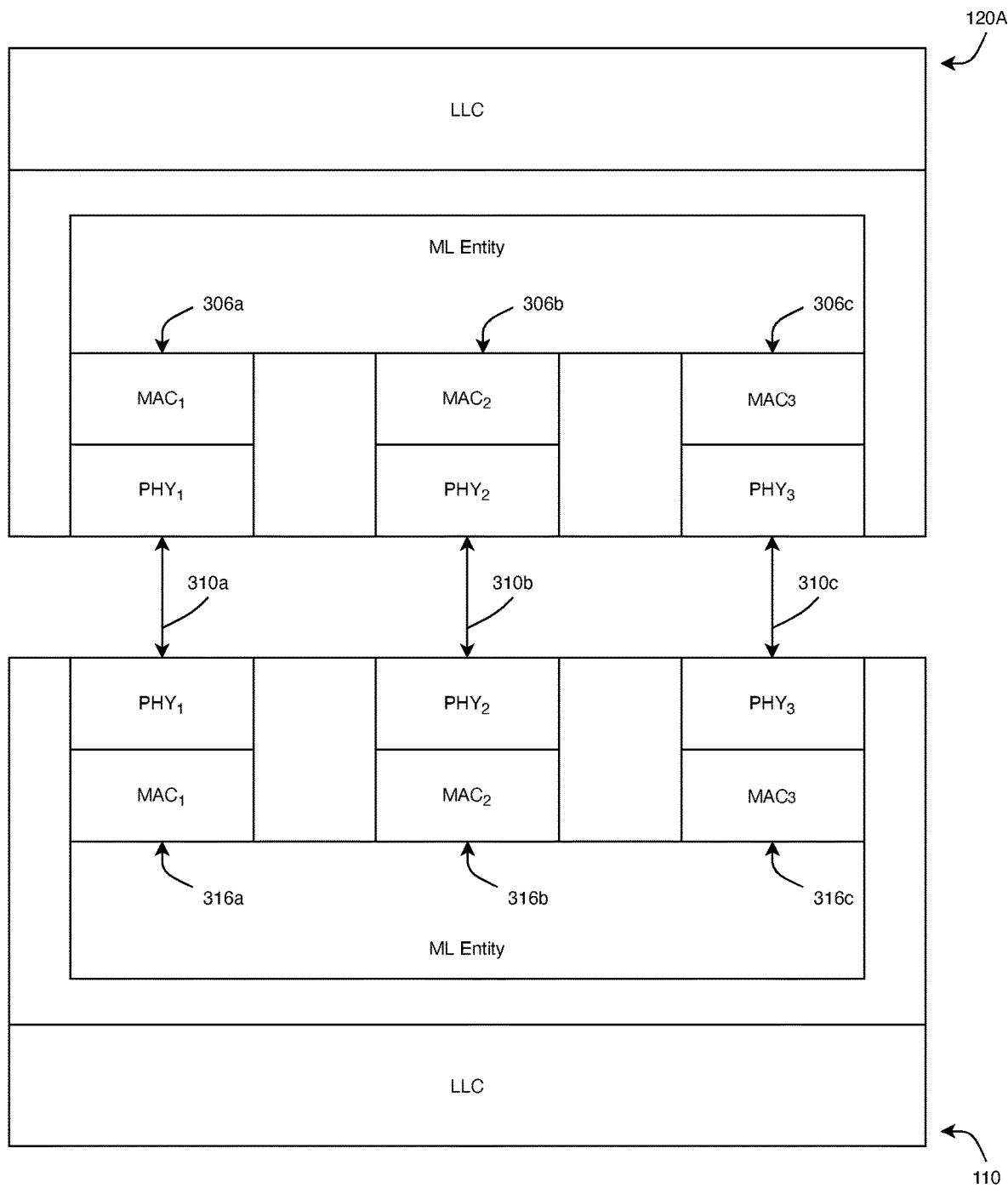
FIG. 3 shows the communication between two MLD devices according to various exemplary embodiments.

FIG. 3 shows the communication between two MLD devices (e.g., AP 120A and STA 110) according to various exemplary embodiments. In the example illustrated in FIG. 3, the AP 120A has a first AP 306a, a second AP 306B, and a third AP 306c, corresponding to first, second, and third links 310a-c, respectively. Similarly, the STA 110 includes a first STA 316a, a second STA 316b, and a third STA 316c. It should be noted however that these MLD devices may include any number of APs/STAs.

The devices are illustrated using some of the networking layers of the device. For example, the devices are shown as including the physical layer (PHY) and the medium access control (MAC) layer. Each link has a corresponding PHY and MAC layer that is associated with the ML entity. On the other hand, each device has a single MAC Service Access Point (MAC-SAP) that serves each of the links and a single logical link control (LLC) layer (and additional upper level layers) that serve all of the links supported by the device.

In some embodiments, the STA 110 may have one radio that is shared among multiple STAs (316a, 316b, and/or 315c), which are referred to hereinafter as co-radio STAs. For example, if a single radio is used for a second STA 316b to communicate over the second link 310b and for a third STA 316c to communicate over the third link 310c, only one of these co-radio STAs may be active at a time. In this example, the co-radio may be currently used by the second STA 316b to communicate via the second link 310b with the AP 120A (a second AP 306b), which means the third STA 316c is in a "Doze" state. This doze state is a virtual doze since the actual radio for the third link 310c is operating, but on the channel for the second link 310b. On the other hand, a first STA 316a may have a dedicated radio, but that radio may also be placed in an actual doze state (e.g., powered off, low power state, etc.). The first and third STAs 316a, 316c may be placed in the doze state because the STA 110 and the AP 120A may only need to communicate over a single link to support ELL communications and by placing the other links into the doze state, the battery of the STA 110 will be preserved.

However, if there is a problem with the second link 310b, the STA 110 and AP 120A should switch the ELL transmissions to one of the other links (e.g., the first link 310a or the third link 310c) within a very short period of time (e.g., in the range of several milliseconds) such that there is no data loss resulting from the switch. Correspondingly, the STA 110 and AP 120A should be ready to receive ELL transmissions within a very short delay (e.g., also in the range of several milliseconds). Examples of switching mechanisms to meet these time requirements will be described in greater detail below.

Figure 4:
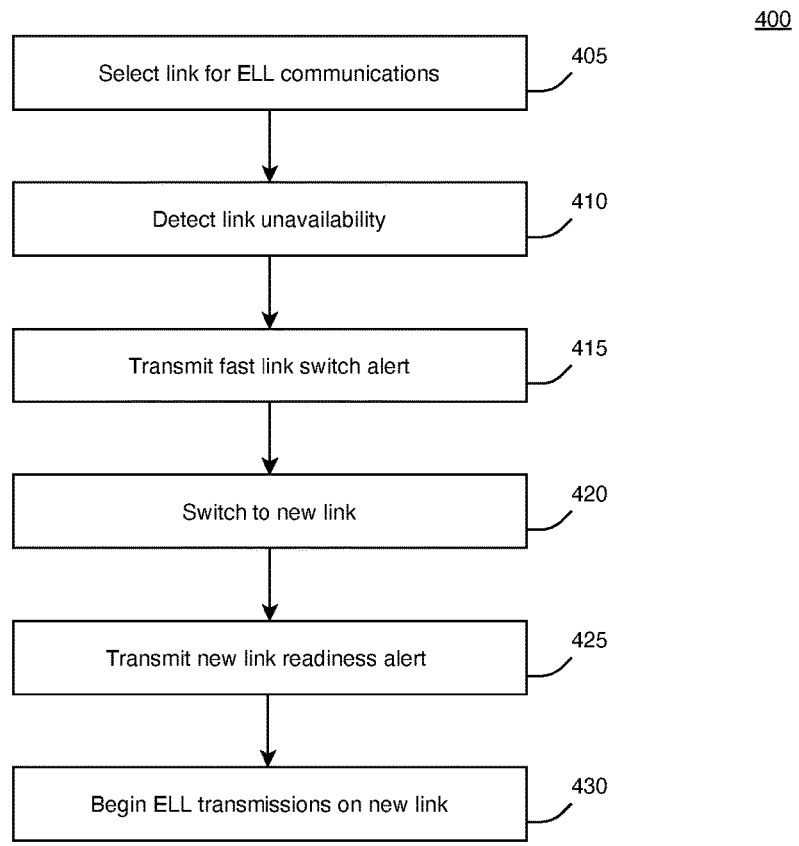
FIG. 4 shows a method of performing fast link switching according to various exemplary embodiments.

FIG. 4 shows a method 400 of performing fast link switching according to various exemplary embodiments. The method 400 will be also be described with reference to FIG. 5, which shows a timing diagram of transmissions between an AP MLD (AP 120A) and a STA MLD (STA 110) according to various exemplary embodiments. In the example illustrated in FIG. 5, the timing diagram is associated with each of the three links (310a-c), one on the 2.4 GHz channel, another on the 5 GHz channel, and the third on the 6 GHz channel, respectively. The top of each timeline shows transmissions by the corresponding AP (e.g., downlink (DL) transmissions (TX)) and the bottom shows transmissions by the corresponding STA (e.g., uplink (UL) TX). A dashed line indicates that the link is inactive or unavailable. Continuing with the example started above, it may be considered that the second link 316b and the third link 316c are in a co-radio scenario.

Uplink data transmissions 504 from the STA 110 can be either initiated by the STA 110 itself (e.g., once it gains the medium access) or be solicited by an UL trigger 506a transmitted from the AP 120A to the STA 110 (e.g., after the AP 120A gains the medium access).

Figure 5:
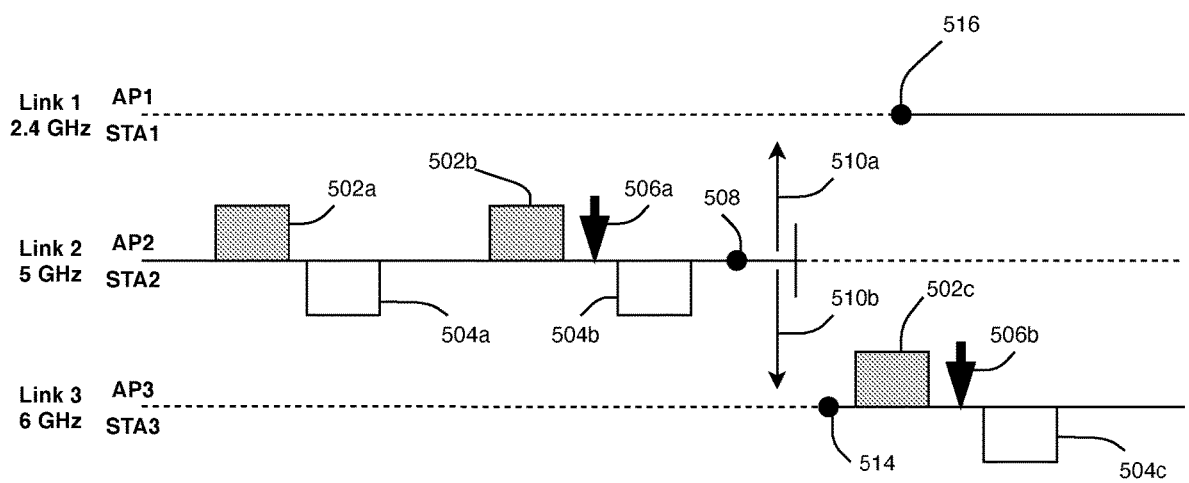
FIG. 5 shows a timing diagram of transmissions between an access point (AP) MLD and a multilink station (STA) MLD according to various exemplary embodiments.

Switch alerts 508, 514, 516 may be transmitted by either the AP 120A or the STA 110 (although FIG. 5 depicts these alerts as being transmitted by the STA 110 only). The alerts are received by the other one of the MLD devices and a corresponding action may be performed by the receiving device. It should be noted that the alerts may include various information as described below and the actions taken by the receiving device may vary depending on the type of information contained in the alert.

Returning to FIG. 4, at 405, the STA 110 (or the AP 120A) selects one of the links for the ELL communications. In the example illustrated in FIG. 5, the Link 2 (5 GHz) channel is the selected channel. As shown in FIG. 5, a first DL TX 502a and a first UL TX 504a occur. Then a second DL TX 502b occurs along with an UL trigger 506a. The receipt of this UL trigger 506a indicates to the second STA (STA2) that the STA2 may perform an UL TX 504b as shown in the timeline. However, after the second UL TX 504b, the STA2 may detect that link 2 is going to be unavailable in 410. Examples of situations that cause link unavailability were described above. This detection will cause the STA2 to transit a switch alert, in 415, to the AP2 indicating that the STA/AP MLD pair should switch communication links.

At 420, the STA MLD switches its radio from the current link (link 2 in this example) to another link (link 3 in this example), as indicated by arrow 510b. In some embodiments, the STA MLD may also awaken the radio for the other link(s) (link 1 in this example) to serve as a backup, as indicated by arrow 510a. When the STA co-radio switch to link 3 is complete, a switch alert is sent at 425 by the STA3 on the link 3 to the AP3 to indicate the STA 3 is ready to receive communications. In some embodiments, when the STA1 radio is ready, a switch alert is also sent by the STA1 on the link 1 to the AP1 to indicate the STA 1 is also ready to receive communications. In this example, since link 1 is only a backup, link 1 may be used if link 3 also experiences a problem. At 430, ELL transmissions are continued on link 3. That is, the AP3 may then send a DL TX 502c and a UL trigger 506b which causes a UL TX 504c to be transmitted by the STA3.

Figure 6:
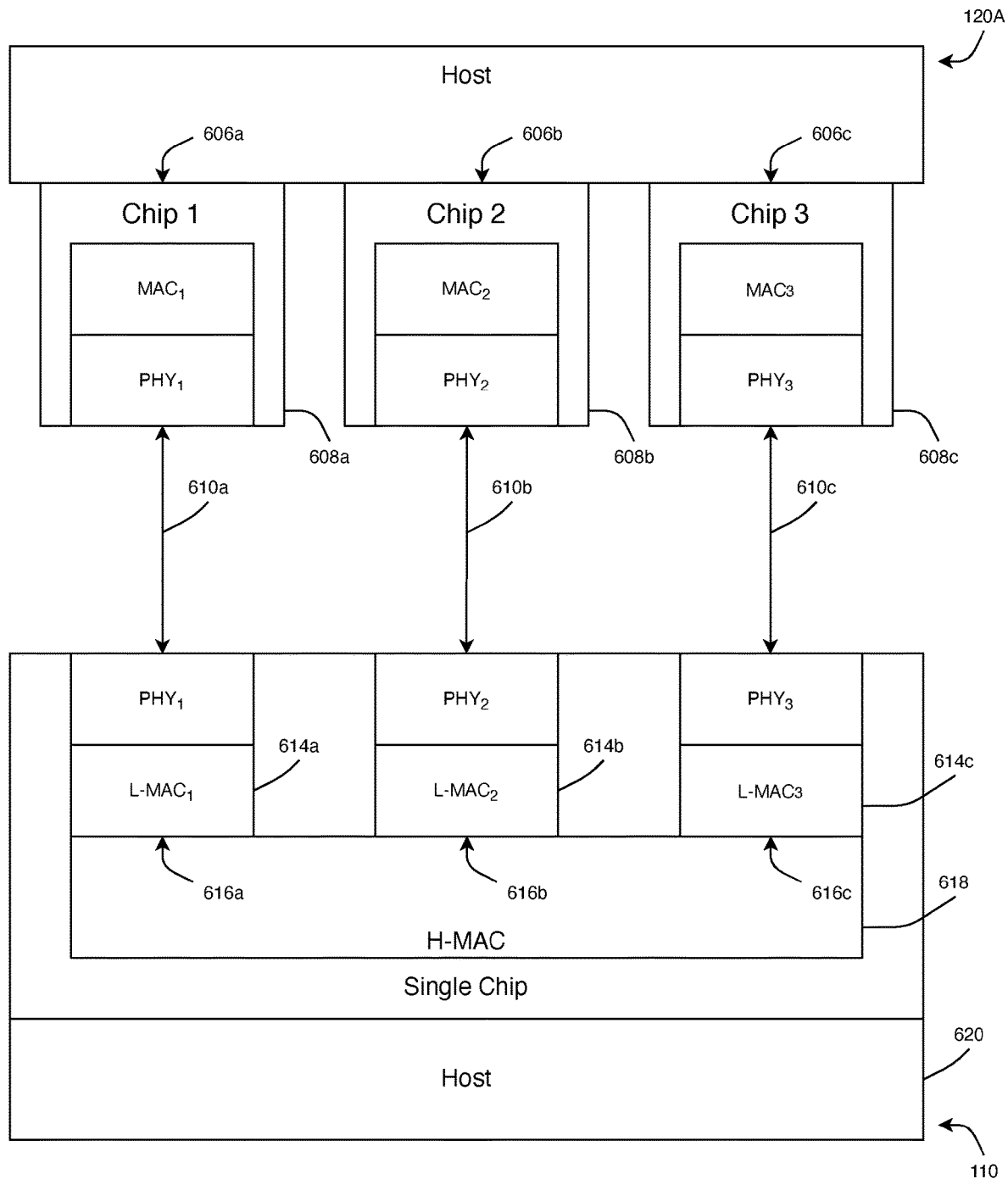
FIG. 6 shows the communication between two MLD devices according to various exemplary embodiments.

FIG. 6 shows the communication between two MLD devices (e.g., STA 110 and AP 120A) according to various exemplary embodiments. The MLD devices illustrated in FIG. 6 are similar to those shown and described above with respect to FIG. 3. As such, a description of similar elements is omitted here. In FIG. 6, the AP MLD has a first AP 606a having a first chip 608a, a second AP 606b having a second chip 608b, and a third AP 606c having a third chip 608c that correspond to the first, second, and third links 610a-c, respectively. The AP MLD also includes a host layer that sits above the three chips 608a-c. In contrast, the STA MLD includes a single chip that supports the PHY layer and first, second, and third lower-level MAC (L-MAC) layers 614a-c for each link 610a-c, respectively. The single chip has a common higher-level MAC (H-MAC) layer 618 for all three links 610a-c. A host layer 620 is also provided on top of the single chip. The MLD devices of FIG. 6 will be referred to in the description of FIGS. 7A-11 below.

Figure 7A:
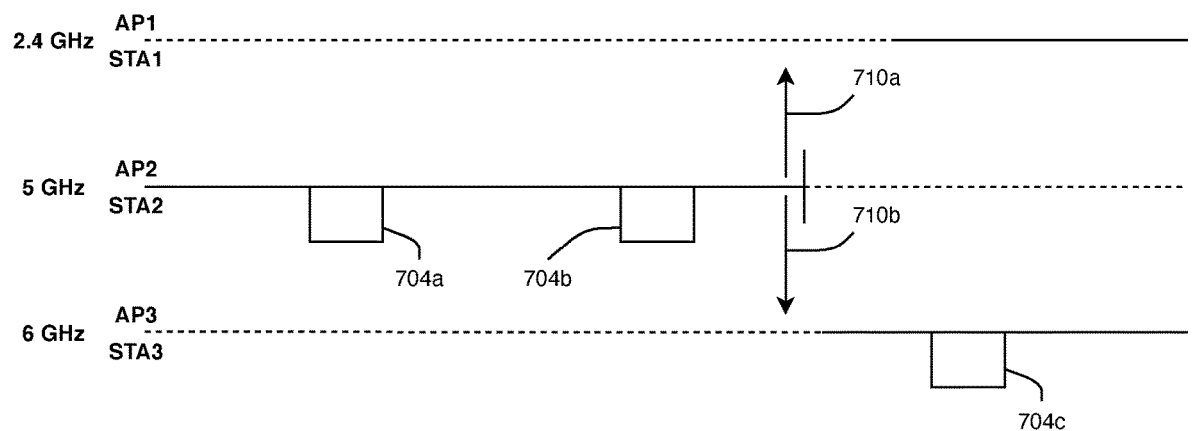
FIGS. 7A and 7B shows timing diagrams of uplink transmissions by an STA MLD according to various exemplary embodiments.
Figure 7B:
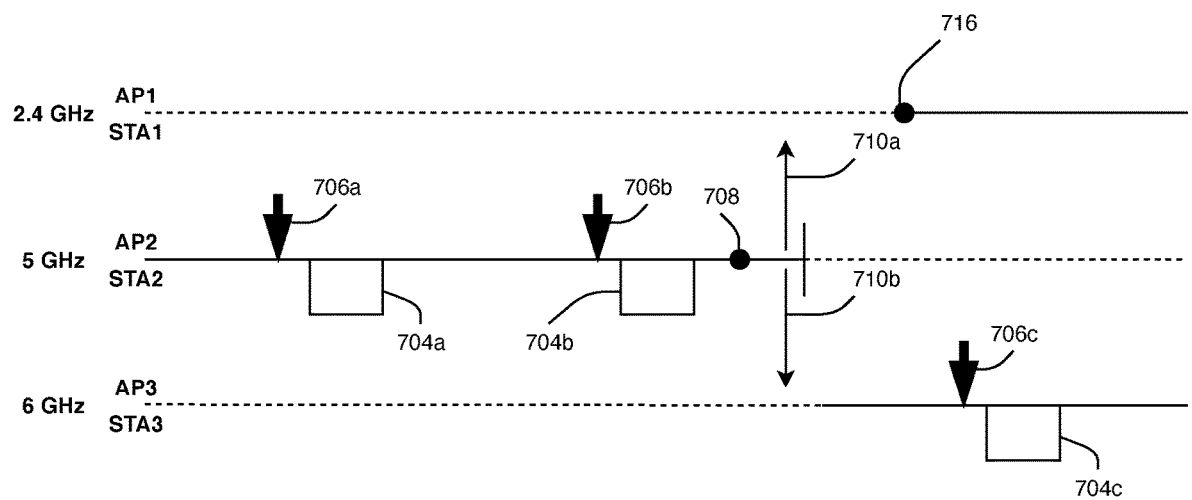

FIGS. 7A and 7B show timing diagrams of uplink transmissions by an STA MLD (e.g., STA 110) according to various exemplary embodiments. Since FIGS. 7A and 7B focus on UL TX (e.g., transmission from the STA MLD to the AP MLD), only UL communications are shown on the timelines. In this example, it may be considered that the AP/STA MLD pair initially communicate over the Link 2 (5 GHz) channel (e.g., second link 610*b*). In one exemplary embodiment, the STA MLD may select the link with the best channel quality and adequate data rates to support ELL communication. As shown in the timeline, the STA2 (e.g., second STA 614*b*) may transmit UL TX packets (704*a*, 704*b*) to the AP2 (e.g., second AP 608*b*) via link 2. As also shown in the timeline by the dashed lines, while the STA 2 is transmitting, the STA1 (e.g., first STA 614*a*) and the STA3 (e.g., third STA 614*c*) may be in the doze mode to save power.

At a later time, the STA MLD determines that the current ELL link (e.g., link 2) will become unavailable for a period longer than a worst-case latency requirement for ELL communications. In one example, this latency may be greater than 5 ms. The STA MLD will then switch the co-radio from the current link (e.g., link 2) to the other link supported by the co-radio (e.g., link 3), as indicated by arrow 710*b*. As shown in the timeline, this switch may be performed in a very short period of time (e.g., less than 0.2 ms). Since the co-radio is already on, the switch merely tunes the radio to a different frequency (e.g., from 5 GHz to 6 GHz). The UL transmissions (704*c*) may then continue on link 3 (e.g., third link 610*c*) as shown in the timeline as the co-radio for link 2 is placed into the virtual doze state.

In some embodiments, at the same time as the radio switch is occurring between links 2 and 3, the STA MLD may wake up the radio for link 1 (e.g., first link 610*a*), as indicated by arrow 710*a*. As described above, since this radio may have been powered down, waking up the radio may take longer than the radio switch (e.g., 3-5 ms). It should be noted that waking up a radio from a powered off state may comprise various steps (e.g., turning on the crystal, etc.) and these steps may take longer than merely tuning to a different frequency. As described above, the STA1 may be turned on as a backup in case a problem arises with link 3 so the UL transmissions may be sent using the STA1, if needed. It should be understood that for the STA1 to serve as a backup transmitter, the UL packets may be duplicated or rebuffered by the host for STA1. Exemplary manners of duplicating and/or rebuffering packets will be described in greater detail below.

Unlike the previous examples, there is no alert signal sent from the STA MLD to the AP MLD indicating that the STA MLD will be switching links. This is because the AP MLD may monitor all the links 1-3 (610*a-c*) via the corresponding AP 1-3 (APs 606*a-c*) without regard to power concerns since the AP MLD may have access to a permanent power supply (e.g., plugged into the wall). Thus, the AP 1-3 may be in receive mode at all times. As such, the AP MLD may receive UL transmissions on any of APs 1-3.

Referring to FIG. 7B, in this example, the STA MLD will receive a UL trigger (706*a-c*) from the AP MLD prior to sending the UL transmissions (704*a-c*). Thus, the STA MLD will select the link to be used for UL transmissions (e.g., the link with the best quality that supports ELL data rates) and request the AP MLD to send UL triggers for UL transmissions. Similar to FIG. 7A, the initial selection is the link 2 (5 GHz) channel. As shown in the timeline, the STA2 will receive an UL trigger (e.g., 706*a*) from the AP2 and then send a UL transmission (e.g., 704*a*) corresponding to the UL trigger. Similar to the previous slide, the other radios may be powered off (or virtually powered off) as shown in the timeline.

At a later time, the STA MLD determines that the link 2 will become unavailable (e.g., for any of the previously described reasons). As shown in the timeline, when this occurs, the STA2 will send a switch alert to the AP2, as indicated by arrow 710*b*. The switch alert will indicate to the AP MLD that the STA MLD is going to switch the UL transmissions from the link 2 to a different link (e.g., either link 1 or link 3).

In other exemplary embodiments, if the link 2 is not currently available, the switch alert may be sent via the other radio (e.g., the radio for link 1 after it is awake) or the co-radio after the link switch has occurred. In some embodiments, there may be a fast path between the second L-MAC layer 614*b* and the first L-MAC layer 614*a*. This fast path may provide the indication to the radio of STA1 to wake up due to the unavailability of link 2. The use of this fast path communication may allow the radio of the STA1 to wake up faster than waiting for the communication to travel up the layers from STA2 and back down through STA1.

In another exemplary embodiment, the switch alert may be sent by the radio that gains access to the medium first. The switch alert may be carried in, for example, a control frame, in the MAC header of a data frame or NULL frame, or in an immediate response frame such as an acknowledgment to an AP MLD's transmission. The transmitter that is to send the switch alert should have the highest priority to access the medium. In one exemplary embodiment, the switch alert may include one or pieces of information such as, the link experiencing the problem, the new link to use, the backup link, the UL data buffer status, time budgets, etc.

The AP MLD may receive the switch alert on any of the links. As shown by the timeline, the STA MLD transmits a switch alert on both the links 1 and 2 (708 and 716, respectively). The AP MLD may receive the switch alert on either of these two links. In this example, the switch alert may indicate that the STA MLD intends to transmit the UL transmission (e.g., 704*c*) on link 3. Thus, in some embodiments, the AP MLD may also have a fast path communication link between MAC layers ($MAC_1$-$MAC_3$) so that the $MAC_1$ layer or the $MAC_2$ layer (whichever receives the switch alert) may inform the MAC3 layer that the STA MLD intends to send UL transmissions on link 3. The AP MLD may then schedule a UL trigger (e.g., 706*c*) for the new ELL link and/or the backup link. As illustrated in FIG. 7B, the AP3 sends a UL trigger 706*c* to the STA3 after the radio switch and the STA 3 then transmits the UL transmission 704*c* to the AP3. In some embodiments, the STA MLD may attempt medium access on link 3 and link 1 at the same time to increase the chance of gaining access to the medium for the UL transmissions.

Figure 8A:
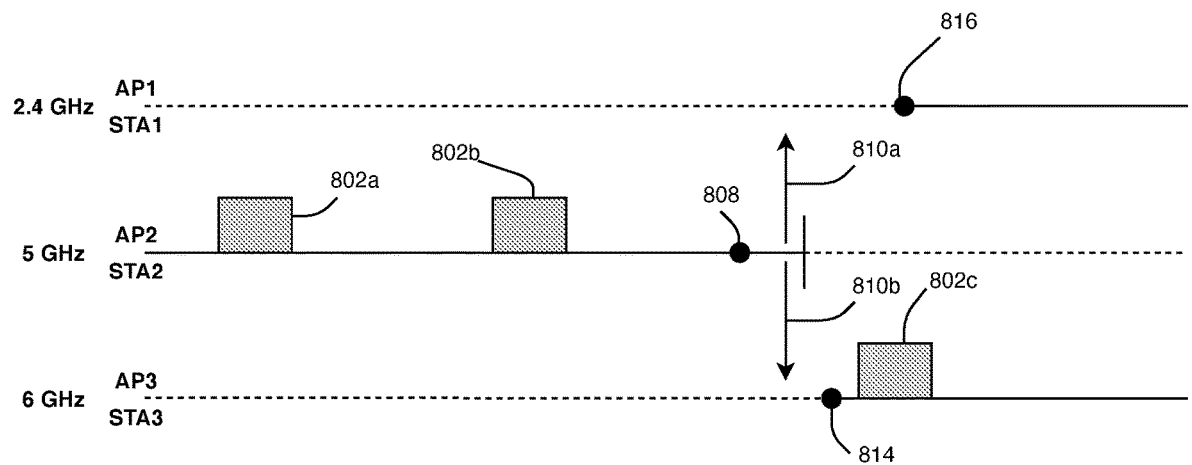
FIGS. 8A and 8B shows timing diagrams of downlink transmissions by an AP MLD according to various exemplary embodiments.
Figure 8B:
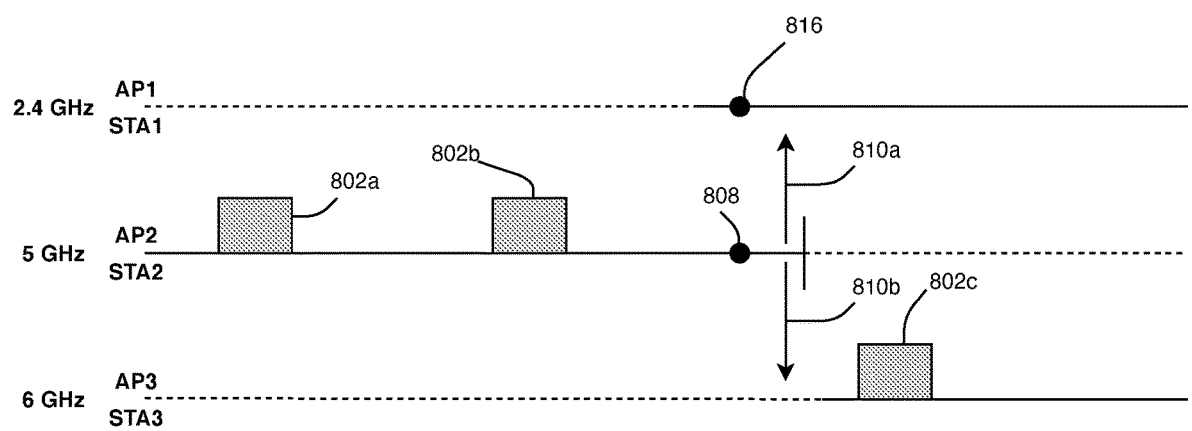

FIGS. 8A and 8B show timing diagrams of downlink transmissions by an AP MLD (e.g., AP 120A) according to various exemplary embodiments. FIGS. 8A and 8B focus on the DL transmissions by the AP MLD. The STA MLD (e.g., 110) may select the link to be used for DL transmissions (e.g., the link with the best quality that supports ELL data rates). As illustrated in FIG. 8A, the initial selection may be the link 2 (5 GHz) channel (e.g., 610*b*). As shown in the timeline, the AP2 will send a DL transmission (802*a*, 802*b*) to the STA2. Similar to the previous slides, the other STA radios may be powered off (or virtually powered off) as shown by the dashed lines in the timeline.

At a later time, the STA MLD may determine that the link 2 will become unavailable. As shown in the timeline, when this occurs, the STA2 will send a switch alert 808 to the AP2. The STA MLD will then switch the co-radio to the other link (e.g., link 3), as indicated by arrow 810*b*, power up the radio for the link 1, as indicated by arrow 810*a*, and prepare to receive and acknowledge the DL transmissions (802*c*) from the AP MLD on one of these other links. In some embodiments, the various STAs and APs may have MAC fast path communications to alert the other STAs or APs of the corresponding STA MLD or AP MLD of various information. As described above, if link 2 is already unavailable, the switch alert may also be sent on link 1 (816) or link 3 (814). When the AP MLD receives the alert, the AP MLD may move, duplicate or rebuffer the DL ELL data as needed. This manipulation of buffered data packets will be described in greater detail below.

Referring to FIG. 8B, in some embodiments, the AP MLD will detect the problem with the current link and send a switch alert to cause the STA MLD to switch the co-radio and/or power up the backup radio. Thus, the STA MLD will select the link to be used for UL transmissions (e.g., the link with the best quality that supports ELL data rates). As shown in the timeline, the AP2 will send DL transmissions (802*a*, 802*b*) on the selected link (e.g., link 2). Similar to the previous slide, the other STA radios will be powered off (or virtually powered off) as shown in the timeline.

At a later time, the AP MLD determines that the link 2 will become unavailable. As shown in the timeline, when this occurs, the AP2 may send a switch alert 808 to the STA2. In some embodiments, the switch alert may be sent via a short alert frame on link 2 disregarding any NAV channel reservation and when the medium becomes idle for at least the policy control function (PCF) Interframe Space (PIFS). In some embodiments, the switch alert may alternatively be sent on a secondary sub-channel of link 2, which is not affected by the NAV or prohibited channel access. In some embodiments, the switch alert may alternatively be sent in an immediate response frame such as an acknowledgement for a transmission from the STA MLD. In a further exemplary embodiment, the AP MLD may send the switch alert on any available link with the STA MLD. For example, as shown in the timeline, the radio for link 1 may have been activated at a time prior to the switch alert being sent, thus, the AP1 may have also sent a switch alert 816 to indicate the problem with the current link (e.g., link 2).

In some embodiments, the STA MLD may have a scanning radio and may keep the AP MLD updated regarding the current scanning channel. In such an embodiment, the AP MLD may switch one of the APs (606*a-c*) to the STA MLD scanning channel and transmit the switch alert to the STA MLD on the scanning channel. The AP that is selected to tune to the scanning channel and transmit the switch alert on the scanning channel may silence its operating channel and/or notify the corresponding STA (e.g., 616*a-c*) not to transmit for a short period of time before switching to the scanning channel.

In some embodiments, the AP MLD and the STA MLD may periodically poll each other on the active ELL link (e.g., link 2 in FIG. 8B) to determine whether there is a problem with the link. If, for example, the STA MLD does not receive a poll at an expected time or the STA MLD does not receive an ACK in response to its poll message, this is an indication that the current ELL link has a problem and the STA MLD should switch to one or more of the alternative links.

After receiving the switch alert, the STA MLD will then switch the co-radio to the other link (e.g., Link 3), as indicated by arrow 810*b*, power up the radio for the Link 1 (or if the radio for link 1 is already powered up), as indicated by arrow 810*a*, and prepare to receive and acknowledge the DL transmissions (802*c*) from the AP MLD on one of these other links.

An alert that is sent from the AP MLD to the STA MLD is called a DL alert and an alert that is sent from the STA MLD to the AP MLD is called an UL alert. Both of the DL alert and UL alert may be included, for example, in a control frame, in an immediate response frame such as an ACK or in the MAC header fields of a data frame.

Both of the DL alert and UL alert may be sent on the current ELL link if the link is still accessible or on the other link (that is not a co-radio link to the current ELL link) when the radio has been powered up and is active. The UL alert may also be sent on the co-radio link when the co-radio has switched from the current ELL link to the new link.

The UL alert (switch alert) is configured to cause the receiver (the AP MLD) to switch the DL transmissions from the current ELL link to one or more of the other links. If the transmission scheme includes the STA MLD receiving a UL trigger prior to initiating a UL transmission, the UL alert will also cause the AP MLD to switch the UL trigger from the current ELL link to one or more of the other links. The UL alert is also configured to cause the AP MLD to be ready to receive and acknowledge UL transmissions from the STA MLD on new links. The DL alert (switch alert) is configured to cause the receiver (the STA MLD) to switch the UL transmissions from the current ELL link to one or more of the other links. The DL alert is also configured to cause the STA MLD to poll DL transmissions from the AP MLD on new links, and be ready to receive and acknowledge DL transmissions from the AP MLD on new links.

Figure 9:
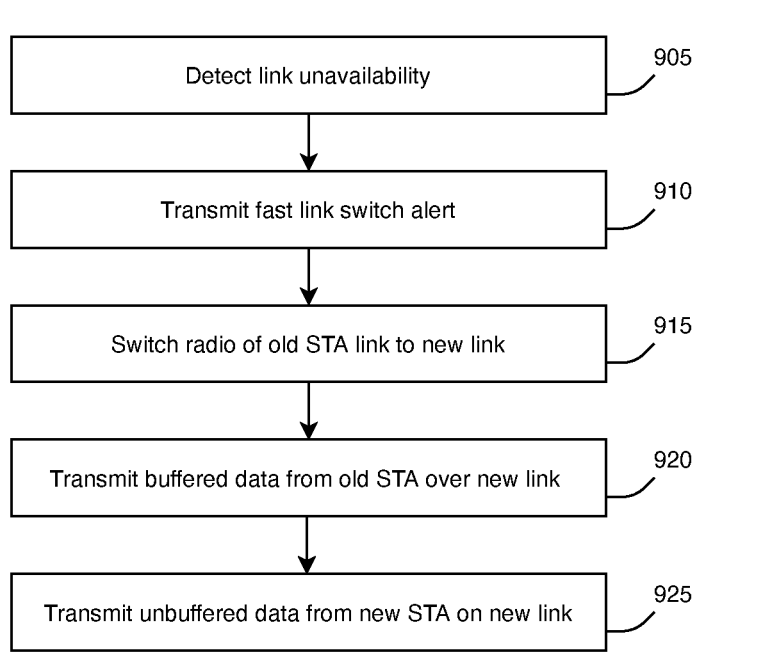
FIG. 9 shows a method of performing fast link switching by an STA MLD according to various exemplary embodiments.

FIG. 9 shows a method 900 of performing fast link switching by an STA MLD (e.g., STA 110) according to various exemplary embodiments. The method 900 assumes that the transmitting device is the STA MLD and that an initial link has already been selected for ELL communications, as described above. At 905, the STA MLD may detect a that the link will be unavailable. At 910, the STA sends a switch alert to the AP MLD to notify the AP MLD that the STA will switch the ELL communications to a different link. At 915, the STA MLD switches the radio of the current STA (e.g., the second STA 616*b*) to a new link (e.g., link 3 or link 1). At 920, the buffered data on the old STA is transmitted to the AP MLD over the new ELL link. In this exemplary embodiment, because the buffered packets are associated with the previous ELL link, the buffered packets may include the MAC header (including MAC addresses) of the previous ELL link and not the new ELL link on which they were transmitted. However, the AP that receives these buffered packets is configured to receive and acknowledge the buffered packets on the new ELL link even though the packets have the MAC header of the previous ELL link. After the buffered data has been transmitted, at 925, the STA MLD transmits unbuffered (new) data to the AP MLD using the STA corresponding to the new link.

Figure 10:
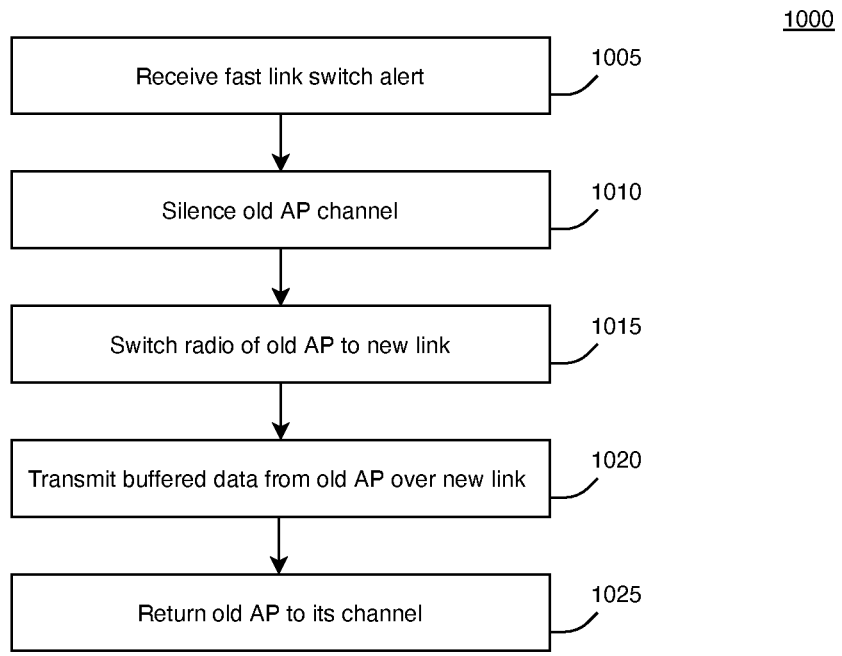
FIG. 10 shows a method of performing fast link switching by an AP MLD according to various exemplary embodiments.

FIG. 10 shows a method 1000 of performing fast link switching by an AP MLD (e.g., AP 120A) according to various exemplary embodiments. The method 1000 assumes that the transmitting device is the AP MLD and that an initial link has already been selected for ELL communications, as described above. After the STA MLD detects a that the link will be unavailable, the AP MLD receives a switch alert, at 1005, from the STA MLD to notify the AP MLD that the STA will switch the ELL communications to a different link. At 1010, the AP MLD silences operating channel of the AP associated with the previous ELL link prior to switching to the new ELL link and prevents the corresponding STA from transmitting during the switching period. At 1015, the AP MLD switches the radio of the old AP that has buffered packets to the frequency of the new ELL link. At 1020, the AP MLD transmits the buffered data packets to the STA MLD over the new ELL link. Again, the STA that receives the buffered packets is configured to receive and acknowledge the buffered packets on the new ELL link even though the packets have the MAC header of the previous ELL link. At 1025, the AP MLD switches the old AP may switch back to its original operating frequency of the channel of the previous ELL link to continue to serve its basic service set (BSS).

Figure 11:
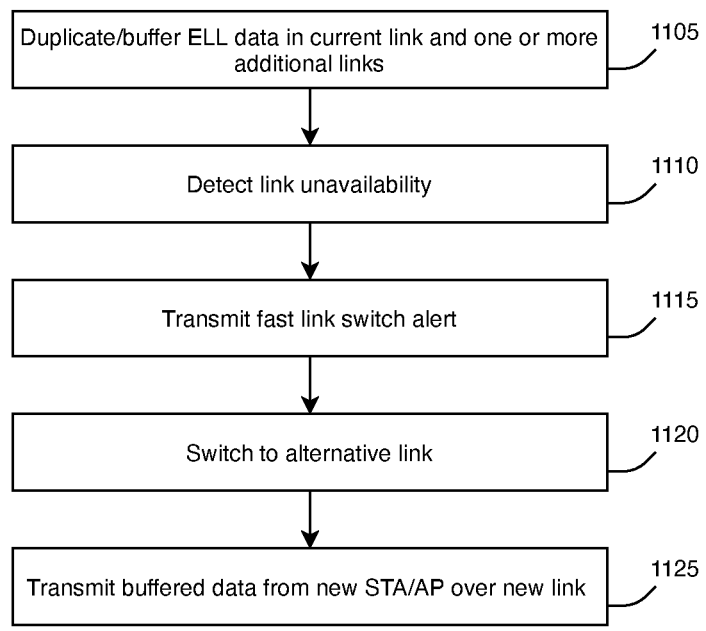
FIG. 11 shows a method of performing fast link switching according to various exemplary embodiments.

FIG. 11 shows a method 1100 of performing fast link switching according to various exemplary embodiments. In the method 1100, either the STA MLD or the AP MLD may use a secondary sub-channel of the current ELL link, which is not affected by the NAV or prohibited channel access, to dump the buffered packets to the peer. In the method 1100, the transmitting device may be either the STA MLD or the AP MLD. At 1105, the transmitting device duplicates the ELL packets and buffers them in the chip for the current ELL link and at least one additional chip corresponding to an alternative link. When the ELL packets are successfully acknowledged by the receiving device, the transmitting device may flush the duplicate ELL packets from the buffer of the alternative link chip(s), (e.g., the current ELL link may communicate this acknowledgement via the MAC fast path described above). At 1110, the transmitting device determines that the current ELL link will become unavailable. At 1115, the transmitting device transmits a fast link switch alert to the receiving device. At 1120, the transmitting device and the receiving device may immediately switch to the one or more alternative links that have buffered the ELL packets as duplicated copies. At 1125, the transmitting device can then transmit the buffered ELL packets via the alternative link to the receiving device.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a first multilink device (MLD) configured to communicate with a second MLD using at least two communication links, the processor configured to perform operations comprising:
   communicating with the second MLD via a first link of the at least two communication links for communications between the first MLD and the second MLD, wherein the first MLD comprises a first MLD component that buffers data packets to be transmitted over the first link and a second MLD component that buffers the data packets to be transmitted over the first link;
   detecting that the first link is unavailable for communications;
   switching a radio of the first MLD to a second link of the at least two communication links;
   transmitting an alert to the second MLD regarding the switching from the first link to the second link; and
   communicating with the second MLD via the second link, including transmitting, via the second link, the data packets buffered by the second MLD component that were not transmitted via the first link prior to switching the radio to the second link.

2. The processor of claim 1, wherein switching the radio comprises tuning the radio from a first frequency associated with the first link to a second frequency associated with the second link.

3. The processor of claim 1, wherein the first MLD comprises a multilink station that receives downlink transmissions or transmits uplink transmissions, wherein the first MLD component is a first station of the multilink station and the second MLD component is a second station of the multilink station and wherein the alert comprises a switch alert indicating the multilink station is switching to the second link.

4. The processor of claim 3, wherein switching the radio comprises switching the radio of the first station to the second link such that the first station transmits any buffered data packets over the second link.

5. The processor of claim 1, wherein the first MLD comprises a multilink access point that is transmitting downlink transmissions, and wherein the alert indicates that the multilink access point is switching to the second link.

6. The processor of claim 5, wherein the multilink access point comprises at least two access points corresponding to the at least two communication links, wherein the first MLD component is a first access point of the at least two access points and the second MLD component is a second access point of the at least two access point.

7. The processor of claim 6, wherein switching the radio comprises switching the radio of the first access point to the second link, such that the first access point transmits any buffered data packets over the second link.

8. The processor of claim 6, wherein the operations further comprise:
   silencing an operating channel of the first access point for a period of time before switching the radio of the first access point to the second link.

9. The processor of claim 1, wherein switching the radio comprises waking up a second radio to tune to a frequency associated with the second link.

10. The processor of claim 1, wherein the communications comprise extremely low latency (ELL) communications.

11. A first multilink device (MLD), comprising:
a transceiver configured to communicate with a second MLD using at least two communication links; and
a processor communicatively coupled to the transceiver and configured to perform operations comprising:
communication with the second MLD via a first link of the at least two communication links for communications between the first MLD and the second MLD, wherein the first MLD comprises a first MLD component that buffers data packets to be transmitted over the first link and a second MLD component that buffers the data packets to be transmitted over the first link;
detecting that the first link is unavailable for communications;
switching a radio of the first MLD to a second link of the at least two communication links;
transmitting an alert to the second MLD regarding the switching from the first one of the at least two communication links to the second one of the at least two communication links; and
communicating with the second MLD via the second link, including transmitting, via the second link, the data packets buffered by the second MLD component that were not transmitted via the first link prior to switching the radio to the second link.

12. The first MLD of claim 11, wherein switching the radio comprises tuning the radio from a first frequency associated with the first link to a second frequency associated with the second link.

13. The first MLD of claim 11, wherein the first MLD is a multilink station configured to receive downlink transmissions or transmit uplink transmissions, wherein the first MLD component is a first station of the multilink station and the second MLD component is a second station of the multilink station and wherein the alert is a switch alert indicating the multilink station is switching to the second link.

14. The first MLD of claim 13, wherein switching the radio comprises switching the radio of the first station to the second link, such that the first station transmits any buffered data packets over the second link.

15. The first MLD of claim 11, wherein the first MLD is an access point configured to transmit downlink transmissions, and wherein the alert indicates the access point is switching to the second link.

16. The first MLD of claim 15, wherein the access point has at least two access points corresponding to the at least two communication links and wherein the first MLD component is a first access point of the at least two access points and the second MLD component is a second access point of the at least two access points.

17. The first MLD of claim 16, wherein switching the radio comprises switching a radio of the first access point to the second link, such that the first access point transmits any buffered data packets over the second link.

18. The first MLD of claim 16, further comprising:
silencing an operating channel of the first access point for a period of time before switching the radio of the first access point to the second link.

19. A method performed by a first multilink device (MLD), comprising:
communicating with a second MLD via a first link of at least two communication links for communications between the first MLD and the second MLD;
buffering, by a first MLD component of the first MLD, the data packets to be transmitted over the first link;
buffering, by a second MLD component of the first MLD, the data packets to be transmitted over the first link;
detecting that the first link is unavailable for communications;
switching a radio of the first MLD to a second link of the at least two communication links;
transmitting an alert to the second MLD regarding the switching from the first link to the second link; and
transmitting, via the second link, the data packets buffered by the second MLD component that were not transmitted via the first link prior to switching the radio to the second link.

20. The method of claim 19, wherein the first MLD comprises a multilink station that receives downlink transmissions or transmits uplink transmissions, wherein the first MLD component is a first station of the multilink station and the second MLD component is a second station of the multilink station and wherein the alert comprises a switch alert indicating the multilink station is switching to the second link.

* * * * *